3,050,444
METHOD FOR THE PRODUCTION OF LEVULOSE
Arthur G. Holstein, Lake Bluff, Ill., and Gunther C. Helsing, Lyndonville, N.Y., assignors, by mesne assignments, to Dawes Laboratories, Inc., a corporation of Illinois
No Drawing. Filed Apr. 3, 1959, Ser. No. 826,890
8 Claims. (Cl. 195—31)

This invention relates to the isolation of monosaccharides and particularly to a method for the preparation of levulose.

This application is a continuation-in-part of our copending application Serial No. 415,980, filed March 12, 1954, and now abandoned, which latter application was copending with application Serial No. 326,582, filed December 17, 1952, and now abandoned.

The production of levulose on a commercial scale has posed quite a problem industrially. Heretofore the only commercially feasible method was based on the precipitation of calcium glucosate and calcium levulosate from a mixture of glucose and levulose. This method has proved to be very costly and gives rise to the frequent development of pyrogens in the levulose recovered from the calcium levulosate. It has been known for some time that glucose could be oxidized to gluconic acid, for example by enzyme action on the glucose. The gluconic acid can be recovered from the reaction mixture in the form of the sodium or calcium salt. It is also known that this oxidation can be performed selectively in the presence of levulose, although the literature is conflicting as to the aspect of selectively, particularly as to the extent of enzyme action on the levulose content of invert sugar and other sugar mixtures. However, even with this knowledge available for many years, no one has succeeded heretofore in utilizing this knowledge as the basis for preparing levulose on a commercial scale. One of the principal reasons for this may well be the failure to recognize that the recovery of levulose from solution is exceedingly difficult unless substantially all ionic substances and other contaminants are removed from the solution before recovery is attempted. Aqueous solutions of levulose are used intravenously as a source of calories. Such solutions must be pyrogen free. The frequent occurrence of pyrogens in levulose prepared from calcium levulosate and the necessity for additional treatment of such material in an effort to remove pyrogens therefrom render this process quite costly. As a result, the price of levulose is still much higher than it need be and certainly too high to render levulose feasible as a foodstuff. Levulose is about 40 percent sweeter than cane sugar and its use as a foodstuff would be considered very desirable. The few sources of natural substances such as inulin and fructosan are too limited and costly to provide an adequate basis for commercial levulose production.

One of the objects of the present invention is to provide a method for the preparation of levulose.

Another object is to provide a commercially feasible method for isolating levulose from inverted sucrose or invert sugar in a high state of purity and in high yields.

Other objects will become apparent from the following description and examples.

According to the present invention, generally stated, sucrose is inverted to glucose and levulose by any suitable means, for example by acid hydrolysis using hydrochloric or sulfuric acid, or by enzymatic action, for example with the use of a hydrolase such as invertase. The inversion must be substantially complete for the purposes of this invention. The resulting invert sugar is then subjected to the oxidizing action of enzymes such as glucose oxidase until the glucose is substantially all converted to gluconic acid. The pH of the reaction mixture is controlled in the range of 4.5 to 6.5 by the addition of sodium hydroxide, calcium carbonate or other suitable neutralizing agent. The glucose oxidase may be employed either in the form of the isolated enzyme or may be provided by means of a fermentation procedure in which a viable enzyme system is produced by the action of various mold organisms such as *Aspergillus niger* on a suitable nutrient medium incorporated with the invert sugar. For practical purposes the latter is by far the more economical and has been found to produce excellent results. When the oxidation of glucose to gluconates has been substantially completed, as evidenced by following the optical rotation of test samples taken at intervals during the fermentation, and also observing the temperature drop when the oxidation is completed, the resulting beer is filtered to remove the mycelia and concentrated by evaporation to a specific gravity of not less than 1.45 and as near to 1.50 as possible. The concentrate is diluted with a volume of methanol equal approximately to one-half the volume of the concentrate and the liquor is agitated and allowed to cool with agitation until the crystallization of sodium gluconate (in the instance in which sodium hydroxide is employed during the crystallization) is completed. The crystals are removed, for example by centrifuging the slurry and washed with methanol. The washings may be returned to the mother liquor. The methanol is stripped from the liquor by vacuum distillation. The remaining aqueous liquor is then diluted to approximately double the volume by addition of water. Activated carbon is slurried into the liquor and the liquor is then filtered and cycled through a bed of cation exchange resin and thereafter a bed of anion exchange resin to remove ionic material. The strongly acid polystyrene nuclear sulfonic acid cation exchange resins, such as IR4B, and the weakly basic phenol formaldehyde polyamine anion exchange resins, such as IR120, have been found most satisfactory. Other resins such as Dowex 50 cation exchange resin and Dowex 2 anion exchange resin may be employed. The cycling is continued until the conductivity, measured in grains per gallon, remains below 15 grains and preferably below 4–5. For a very high purity (low ash) levulose, the conductivity should measure below 0.7 grain per gallon. The yield of levulose is substantially enhanced at the lower conductivity levels. This operation is critical to the successful recovery of levulose in subsequent steps of the process. The resulting colorless syrup is then concentrated under a minimum of 26 inches of vacuum to a specific gravity of 1.45. Methanol equivalent to one-half of the volume of the syrup is added and the mixture is thoroughly agitated. The methanol syrup mixture is allowed to cool. When crystals form as the mixture approaches room temperature, additional methanol is added and agitation is employed periodically. The crystal growth of levulose may be accelerated by the addition of seed crystals of levulose. The crystals are recovered from the slurry, for example by centrifuging, and the crystals are washed with methanol and dried under vacuum.

The levulose product of this process has been found to be of very high quality. Substantially no pyrogen problems are encountered. The economics of the process are aided by the sale of the sodium gluconate, for example as a sequestering agent.

For the fermentation step, various mold organisms may be employed, although Aspergillus niger NRL–3 is preferred. Other useful organisms are *Penicillium purpurogenum, Penicillium chrysogenum,* Pseudomonas, Phytomonas and Acetobacter.

The following examples will serve to illustrate several embodiments of the present invention.

Example I

A sterile kettle is charged with 150 pounds of Nuchar grade of sucrose, 50 gallons of water and 10 ounces of hydrochloric acid. The vessel is sealed to maintain sterility. The resulting solution is heated to 70° C. and allowed to cool slowly over a period of approximately 10 hours. This operation results in the conversion of sucrose to invert sugar consisting of substantially equal parts of glucose and levulose. The fermenter is prepared as follows. The fermentation tank is sterilized with steam. The invert sugar solution is transferred to the fermenter. The nutrient medium is developed in the solution by adding 0.6 pound of nutrient salts and 0.3 gallon of corn steep liquor. The nutrient salt mixture is composed of 1.90 parts by weight of magnesium sulfate heptahydrate, 2.39 parts of potassium dihydrogen phosphate, 1.33 parts of urea and 5 parts of diammonium hydrogen phosphate. The fermentation medium is then inoculated with an inoculum of *Aspergillus niger* NRL-3 from a seed tank in which the spores, with the underlying nycelia, are suspended in sterile water containing 0.01% of a wetting agent. The inoculum is transferred to the fermenter after the medium has been heated to a temperature in the range of 30-38° C. Sterile air is passed into the fermenter at the rate of 4.5-5.5 cubic feet per minute, maintaining the pressure at 28-32 pounds per square inch. The temperature is maintained at 28-38° C. Samples for determination of the initial optical rotation are taken at the start. The pH of the broth is maintained between 4.5-6.5 by the injection of 50 percent caustic soda solution. After two hours, the aeration is accelerated to 12-14 cubic feet per minute, being careful to avoid excessive foaming. An antifoam solution consisting of 8 pounds of octadecanol in 8 gallons of water is added as required. Aeration is continued at 12-14 cubic feet per minute until fermentation is complete. This point is determined by determining the optical rotation of samples taken at intervals. The final rotation should be at least 2.3 times the initial optical rotation. A good fermentation cycle will also show a definite drop in the temperature of the broth at the same time that the optical rotation reaches 2.3 times the initial rotation.

The fermentation beer is then transferred to a tank, 8 pounds of filter-cel is added with agitation and the slurry is passed through a filter press. The filtered beer is transferred to a kettle, heated to 80° C. for 30 minutes and 4 pounds of activated carbon ("Norit") and 4 pounds of filter-cel are added with agitation. The slurry is filtered and the filtrate is transferred to a still where it is concentrated to a specific gravity of not less than 1.45 and as near to 1.50 as possible. The concentration is done under a minimum of 26 inches of vacuum. When the proper concentration is reached, the final volume will be approximately 13 gallons. To the concentrate is added 6.5 gallons of methanol with agitation. The sodium gluconate will commence to crystallize. Periodic agitation is employed for a period of several hours and the slurry is then allowed to cool overnight. The crystals of sodium gluconate are separated by centrifuging and washed in the centrifuge with methanol with approximately one gallon of methanol. The methanol levulose syrup mixture is collected from 4 to 5 runs, combined and stripped of methanol in a vacuum still. The liquor level is maintained at 60-70 gallons by the addition of water. Following removal of methanol, the liquor is made up to 150 gallons by the addition of water, 8 pounds of activated carbon ("Norit") are added with agitation and the slurry is filtered and passed through cation resin beds (IR-120) and then through anion resin beds (A-7) until the conductivity of the liquor, measured in grains per gallon, is below 15 and preferably below 4-5. For a very low ash product, the conductivity is reduced to below 0.7 grain per gallon. The resulting colorless levulose syrup is concentrated by evaporation under a minimum of 26 inches of vacuum to a specific gravity of 1.45 and methanol equivalent to one-half the volume of the syrup is added with thorough agitation. The methanol levulose syrup is allowed to cool. When it approaches room temperature and crystals commence to form, additional methanol is added with periodic agitation of the batch. The crystalline growth of the levulose is accelerated by addition of levulose seed crsytals. When crystallization is complete, the crystals are isolated by centrifuging and are washed with approximately one gallon of methanol. The crystals are dried on trays under vacuum, or in a parallel flow rotary drum dryer as desired. The yield from 1500 pounds of sucrose is 500 pounds of first crystal and 50 pounds of residual levulose. The yield of sodium gluconate is 800 pounds. The incidence of pyrogenicity in the levulose product is substantially negligible.

Example II

The process of Example I is repeated, using 27 pounds of U.S.P. calcium carbonate in the fermentation liquor in place of the sodium hydroxide used to maintain the pH between 4.5-6.5. Following the fermentation step as in Example I, the filtered beer is concentrated under a minimum of 26 inches of vacuum to a maximum of 40 gallons, and if possible less than this unless calcium gluconate starts to crystallize. To the concentrate is added 3-4 gallons of methanol to prevent bacterial growth and to aid in a more complete crystallization of the calcium gluconate. The levulose syrup is processed as described in Example I.

Others may practice the invention in any of the numerous ways which will be suggested to one skilled in the art upon a reading of this specification. It is intended that all such practice of the invention be included hereunder provided it falls within the scope of the appended claims.

We claim:

1. The method for the production of levulose comprising inverting an aqueous solution of sucrose, adding a nutrient salt mixture and corn steep liquor to the solution, inoculating the resulting broth with active inoculum of a glucose oxidase-producing mold, fermenting the broth at a temperature in the range of 28-38° C., maintaining the pH of the broth in the range of 4.5-6.5 by the addition of an alkalinizing agent selected from the group consisting of alkali metal and alkaline-earth metal inorganic alkaline substances, passing air through the fermentation broth during fermentation at a rate in the range of 4.5-5.5 cubic feet per minute and at a pressure in the range of 28-32 pounds per square inch, increasing the aeration after a period of time in the range of 2-3 hours to a rate in the range of 12-14 cubic feet per minute, continuing aeration until samples taken at intervals show an optical rotation of 2.3 times that of the initial broth, filtering the beer through activated carbon and filter aid, concentrating the beer under vacuum to a specific gravity between approximately 1.45 and 1.50, adding sufficient methanol with agitation to increase the volume of the beer to one and one-half times, cooling the mixture to room temperature and allowing the mixture to stand until precipitation of gluconate salt is completed, removing the gluconate salt, distilling off the methanol content of the filtrate, diluting the filtrate with approximately an equal volume of water, filtering the solution through activated carbon and filter aid, passing the solution successively through cation exchange resins and anion exchange resins until the ionic content is reduced to a level in the range of 0.7-15 grains per gallon as measured by conductivity methods, concentrating the effluent under a minimum of 26 inches of vacuum to a specific gravity of 1.45, adding methanol equivalent to one-half the volume of the syrup, allowing the mixture to cool and the levulose to crystallize, removing the crystals, washing the crystals with methanol and drying the levulose crystals under vacuum.

2. The process of claim 1 in which the glucose oxidase-producing mold is *Aspergillus niger* NRL-3 and the alkalinizing agent is sodium hydroxide.

3. The process of claim 1 in which the glucose oxidase-producing mold is *Aspergillus niger* NRL-3 and the alkalinizing agent is calcium carbonate.

4. The process of claim 1 in which the cation exchange resin is a strongly acidic polystyrene nuclear sulfonic acid exchange resin and the anion exchange resin is a weakly basic phenol formaldehyde polyamine exchange resin.

5. In the method for the production of levulose from sucrose wherein invert sugar formed of the sucrose is fermented in the presence of glucose oxidase with the introduction of air and at a temperature of 28–38° C. and at a pH of 4.5–6.5 maintained by the addition of an alkalinizing agent selected from the group consisting of alkali and alkaline earth metal compounds, the steps of filtering the fermentation products, concentrating the filtrate to a specific gravity between approximately 1.45 to 1.50, diluting the concentrate with methanol in an amount to correspond to 50 percent by volume of the concentrate, cooling the mixture and allowing the mixture to stand whereby the gluconate salts precipitate from solution, separating the crystallized salts, distilling off the methanol, diluting the remainder with approximately an equal volume of water, pasing the solution successively through a cation exchange resin and an anion exchange resin until the ionic content is reduced to a level in the range of 0.7–15 grains per gallon as measured by conductivity, concentrating the solution to a specific gravity of about 1.45, diluting the concentrate with methanol in an amount corresponding to about 50 percent by volume of the concentrate, allowing the solution to cool whereby levulose crystallizes from the solution, and separating the crystallized levulose from the remainder.

6. The process as claimed in claim 5 in which the alkalinizing compound is calcium carbonate.

7. In the method for the production of levulose from sucrose wherein invert sugar formed of the sucrose is fermented in the presence of glucose oxidase and air at a temperature of 28–38° C. and at a pH of 4.5–6.5 maintained by the addition of an alkalinizing agent selected from the group consisting of alkali and alkaline earth metal salts and from which the gluconic acid that is formed is separated from the fermentation product by crystallization of the gluconic acid salts that are formed, the steps of filtering the remaining solution containing levulose through activated carbon, passing the solution successively through a cation exchange and an anion exchange until the ionic content of the solution is reduced to a level in the range of 0.7–15 grains per gallon as measured by conductivity, concentrating the effluent from the ion exchange to a specific gravity of about 1.45, diluting the concentrate with methanol by an amount corresponding to one-half the volume of the concentrate, allowing the mixture to cool whereby levulose crystallizes from the solution, and removing the formed crystals of levulose.

8. The method as claimed in claim 7 in which the separated crystals of levulose are washed with methanol and dried under vacuum.

References Cited in the file of this patent

UNITED STATES PATENTS

| | | |
|---|---|---|
| 2,482,724 | Baker | Sept. 20, 1949 |
| 2,602,768 | Crocker | July 8, 1952 |
| 2,651,592 | Baker | Sept. 8, 1953 |
| 2,753,279 | Cushing et al. | July 3, 1956 |

OTHER REFERENCES

Karrer: "Organic Chemistry," Elsevier Publ. Co., Inc. (1950), p. 352.